United States Patent [19]

Tisdell

[11] Patent Number: 5,125,183

[45] Date of Patent: Jun. 30, 1992

[54] FISHING APPARATUS

[75] Inventor: Thomas O. Tisdell, Marstons Mills, Mass.

[73] Assignee: Blodgett & Blodgett, P.C., Worcester, Mass.

[21] Appl. No.: 567,597

[22] Filed: Aug. 15, 1990

[51] Int. Cl.$^5$ ............................................. A01K 97/00
[52] U.S. Cl. .......................................... 43/54.1; 43/56; 43/57.1; A01K/97/00
[58] Field of Search ............ 43/54.1, 55, 56, 57.1; 206/315.1, 315.11, 315.5, 372, 373, 374; 220/23.8, 23.86, 23.83, 23.6, 94 R, 94 A, 95; 24/300, 17 A, 17 B

[56] References Cited

U.S. PATENT DOCUMENTS

| | | | |
|---|---|---|---|
| 513,044 | 10/1894 | Handlan | 43/54.1 |
| 1,484,399 | 2/1924 | Kroha | 224/199 |
| 1,823,971 | 7/1958 | Hoyt | 224/920 |
| 2,817,472 | 6/1957 | Parkhurst | 224/920 |
| 2,968,887 | 1/1961 | Woolworth | 43/56 |
| 3,397,804 | 8/1968 | Davis | 220/23.8 |
| 3,515,263 | 9/1970 | Carlson | 206/16 |
| 3,659,369 | 5/1972 | Hermanson | 43/21.2 |
| 3,678,611 | 7/1972 | Files | 43/26 |
| 3,751,845 | 8/1973 | Leeuwen | 43/56 |
| 3,798,826 | 2/1974 | Fergusion | 43/54.5 |
| 3,889,805 | 6/1975 | Korten | 206/223 |
| 3,987,574 | 7/1976 | Pennino | 43/26 |
| 4,353,182 | 10/1982 | Junkas | 43/54.5 R |
| 4,569,108 | 2/1986 | Schwab | 24/300 |
| 4,759,148 | 7/1988 | Love | 43/54.1 |
| 4,759,963 | 7/1988 | Uso | 428/100 |
| 4,765,472 | 8/1988 | Dent | 220/23.86 |
| 4,831,692 | 5/1989 | Chaun | 24/300 |
| 4,845,881 | 7/1989 | Ward | 43/21.2 |
| 4,989,744 | 2/1991 | Tominage | 220/94 R |

Primary Examiner—Kurt Rowan
Assistant Examiner—Chuck Y. Mah
Attorney, Agent, or Firm—Blodgett & Blodgett

[57] ABSTRACT

Equipment for storing and carrying fishing gear, including a pocketed apron lying inside a bucket, an elastic cord holding a rod across the top of the bucket, and a bucket handle or supporting the rod.

5 Claims, 2 Drawing Sheets

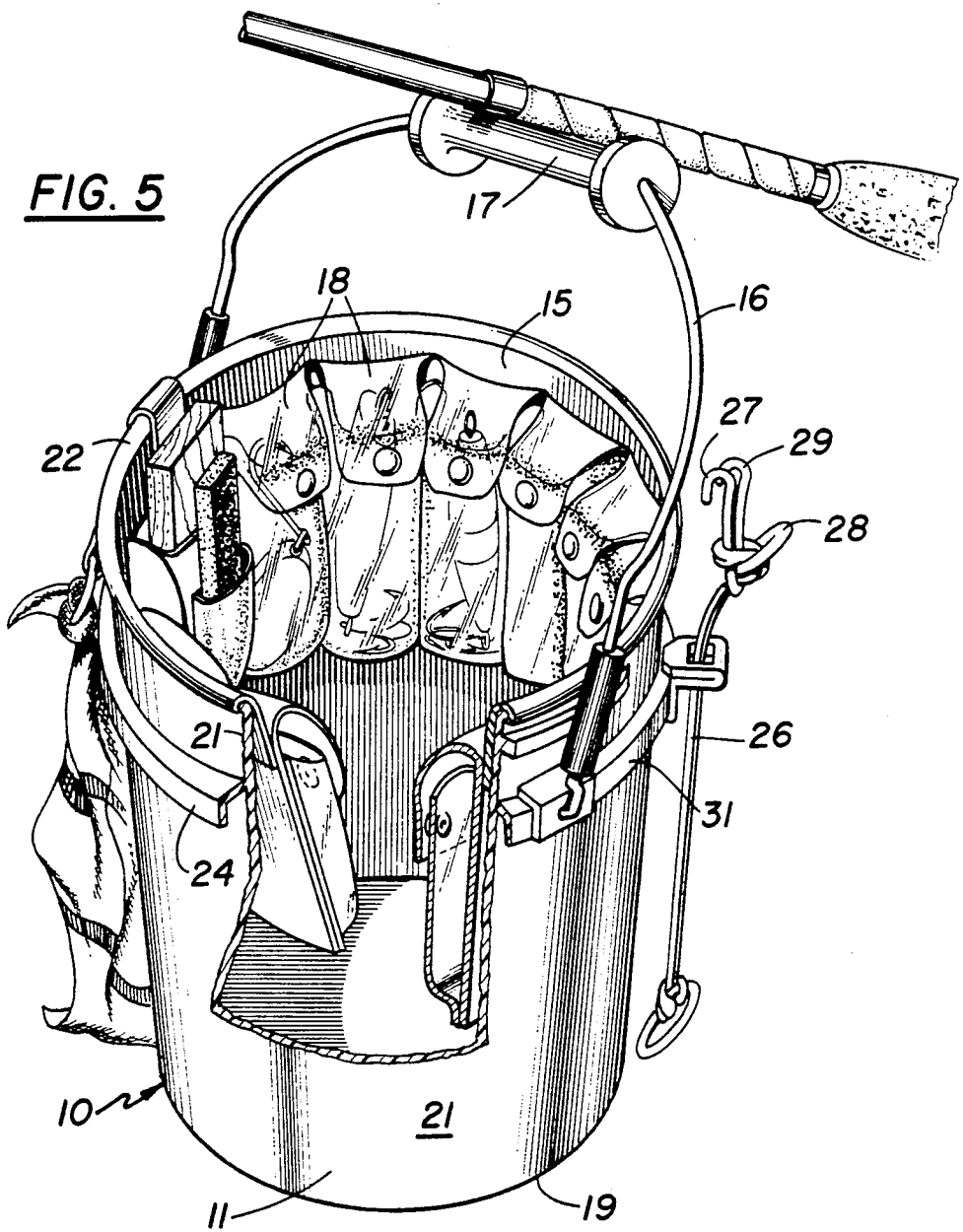
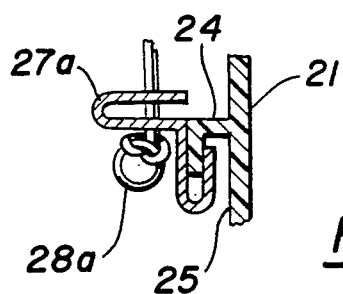

FISHING APPARATUS

The sporting (and, sometimes, commercial) activity of fishing with rod and reel necessitates the use of a considerable amount of equipment. This is particularly true in the case of the so-called "surf fishing" where the line, bait, and hook are cast into ocean breakers. The fishing site is usually located some distance from the fisherman's vehicle and, so, he wishes to carry all gear that he could possibly need on a single trip from the vehicle to the site. Since he sometimes has to carry his equipment through rough vegetation, it is desirable that the load be arranged so that there are no loose or projecting pieces of gear to snag on bushes or to drop on the way. At the same time, it is desirable that the equipment not only be readily accessible during fishing, but that equipment not being used at a given time be securely stored. This is because of the fact that small items are easily lost in the sand at the fishing location. Furthermore, no sharp-pointed gear should extend from the assemblage to ensnare the fisherman during his fishing activity. Nevertheless, he should be able to have access to bait at the bottom of his bucket without first moving other items.

Attempts have been made in the past to provide fishermen with carrying cases or the like to store all the fishing gear in a single unit. However, these attempts have been notoriously unsuccessful, because the equipment developed has not only been very expensive, but has lacked the attributes described above as being desirable. These and other deficiencies of the prior art equipment have been obviated in a novel manner by the present invention.

It is, therefore, an outstanding object of the present invention to provide a fishing apparatus for storing and transporting all necessary fishing gear in a single unit.

Another object of the invention is to provide an assemblage for carrying fishing equipment in such a manner that items do not fall off or become entangled in vegetation.

A further object of the invention is to provide an apparatus for neatly storing gear at the fishing location in such a way that each item is readily accessible without disturbing other items and without the possibility of loss of small items in the sand.

Another object of the invention is a fishing apparatus of the type described which is simple and rugged in construction, which is inexpensive to manufacture and sell, and which is capable of a long life of useful service with a minimum of care and maintenance.

A further object of the invention is to provide a fishing apparatus including a bucket in which plugs, hooks and other small gear can be carried inside the bucket without limiting rapid access to bait also carried in the bucket.

With these and other object in view, as will be apparent to those skilled in the art, the invention resides in the combination of parts set forth in the specification and covered by the claims appended hereto.

SUMMARY OF THE INVENTION

In general, the invention consists of a fishing apparatus having a bucket with a bottom and a tubular main body terminating in an upper edge and a flexible apron extending over the said upper edge of the bucket and extending downwardly therefrom along the inner surface of the main body, the apron being provided with pockets to receive tackle. The apron extends completely around the upper interior portion of the bucket and is formed with a clip to envelope the said upper edge of the bucket to support the weight of the apron and of any tackle carried in the pockets.

More specifically, the bucket has a flange extending completely around the bucket adjacent the upper edge thereof, the flange having a downwardly-directed recess, and an elastic belt is provided for holding a fishing rod, the belt extending generally diametrically across the upper edge of the bucket and having a hook at each end that engages the flange and locks into the said downwardly-directed recess. The bucket is provided with a bail and with a detent to lock the bail in an upright position, and a handle is mounted on the bail, which handle is generally cylindrical with enlarged ends to provide a leaning support for a fishing rod.

BRIEF DESCRIPTION OF THE DRAWINGS

The character of the invention, however, may be best understood by reference to various specific structural forms, as illustrated by the accompanying drawings in which:

FIG. 5 is a perspective view of the apparatus with a portion broken away, and

FIG. 6 is a sectional view taken on the line VI—VI of FIG. 5.

DESCRIPTION OF THE PREFERRED EMBODIMENT

Figure 1:
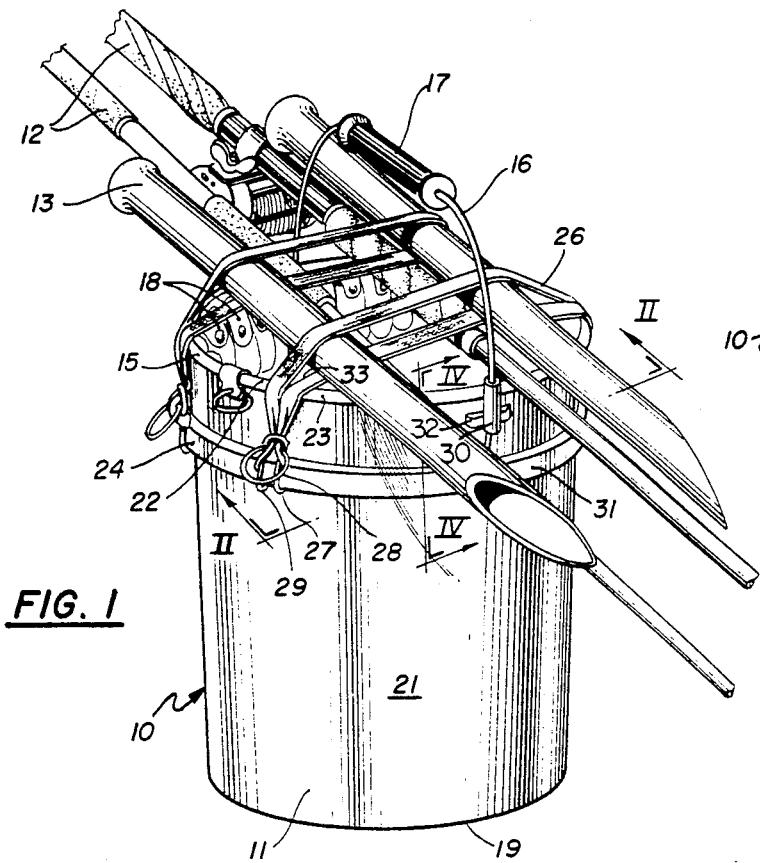
FIG. 1 is a perspective view of a fishing apparatus incorporating the principles of the present invention.

Referring first to FIG. 1, which best shows the general features of the invention, the fishing apparatus, indicated generally by the reference number 10, is shown as including a bucket 11. Associated with the bucket are fishing rods 12, sand spikes 13, and an apron 15. The bucket 11 is provided with a bail 16 which has a handle 17. The apron 15 is provided with pockets 18.

Figure 2:
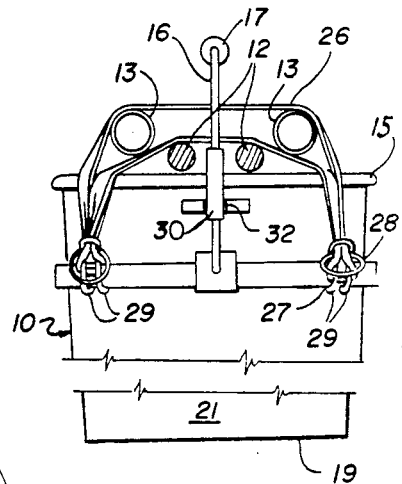
FIG. 2 is a front elevational view of the apparatus with some elements in section, as viewed along the line II—II of FIG. 1.

FIGS. 1 and 2 illustrate the manner in which the bucket 11 is provided with a bottom 19 and a tubular, slightly-tapered main wall 21 that terminates in a beaded upper edge 22 (FIG. 2). The apron 15 is formed of a somewhat-flexible, clear, elastomeric polymer (in the preferred embodiment). It extends over the upper edge 22 of the bucket and drapes downwardly along the inner surface of the main body. As has been stated, the apron is provided with pockets 18, which (in the preferred embodiment) are generally semi-cylindrical, open-topped and of a size to receive small tackle, such as plugs, spoons, hooks, etc. The pockets are closed by flaps held by Velcro fastening means.

The apron extends completely around the upper portion of the interior of the bucket and is formed with a generally U-shaped clip 23 that envelopes the bead at the upper edge 22 of the bucket. The clip is stiff enough to grasp the said upper edge and to support the weight of the apron and the tackle carried in the pockets.

Figure 3:
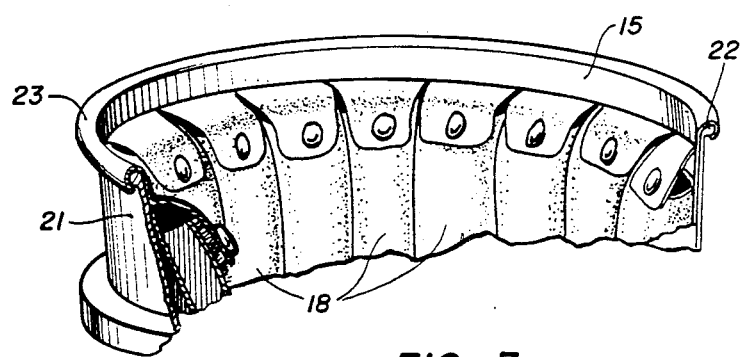
FIG. 3 is a perspective view of a portion of the apparatus with parts broken away.

The nature of the apron 15 and its pockets 18 is well shown in FIG. 3. It also illustrates the manner in which the clip 23 engages the upper edge of the main wall 21 of the bucket, so that the apron hangs downwardly along the interior surface of the bucket.

Figure 4:
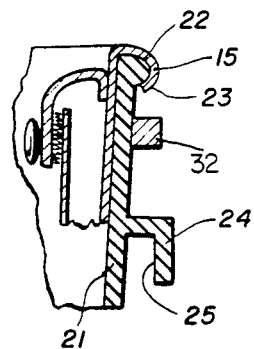
FIG. 4 is a sectional view of the bucket taken on the line IV—IV of FIG. 1.

FIG. 4 shows some details of construction of the bucket 11. A flange 24 of annular configuration is located spaced from, but adjacent to the upper edge 22 of the bucket. The flange has a downwardly-directed recess 25 extending completely around the bucket.

Returning to FIGS. 1 and 2, it can be seen that an elastic belt 26 is provided for holding the fishing rod 12 and the sand spike 13. The belt extends generally diametrically across the upper edge 22 of the bucket 11 and has a hook 27 at each end that engages the flange 24 and locks into the downwardly-directed recess 25. Each hook consists of a loop 28 to which the belt is tied and of two U-shaped fingers 29 that extend from the loop to engage the flange and extend into the recess.

Also evident in FIG. 5 is the manner in which the bucket is provided with detent means to lock the bail 16 in the upright position. In that way, the handle 17 is available as a rest for a fishing rod 12 to be leaned against it at the fishing site. This makes the rod readily available while changing tackle, etc. The bail 16 is provided with a resilient sleeve 30 (FIG. 2) that creates friction with a flange 32. In the preferred embodiment, the handle 17 is formed of a soft, resilient material that will be comfortable to the hand and that will not damage the fishing rod. The enlarged ends will tend to prevent the rod from sliding off the ends of the handle.

The operation and advantages of the invention will now be readily understood in view of the above description. Assuming that the bucket 11 is empty and free of all fishing tackle, the logical procedure for a fisherman preparing for a fishing trip would be to insert a supply of bait in the bottom of the bucket. Possibly, water or seaweed would also be added.

With the bait in place in the bottom of the bucket, the apron 15 is inserted into the top of the bucket, so that it slides down the inner surface of the main wall 21. Eventually, the clip 23 strikes the upper edge 22 and snaps into place. The small fishing gear, such as plugs, hooks, and the like can be inserted into the pockets either before or after the apron is inserted into the bucket.

Now that the apron is in place, the bail 16 is raised to the vertical position and the elongated equipment is placed across the top of the bucket and held in place by one or more elastic belts 26. In the illustration of FIGS. 1 and 2, the rods 12 are in direct contact with the surface of the clip 23 which overlies the upper edge 22 of the bucket. The rods are held in place by first engaging the hook 27 to the flange 24 at one side of the bucket, pulling the belt over the rods, and engaging the hook 27 at the other end to the flange at the other side of the bucket. The belt can be stretched very tightly over the rods, because of the insertion of the hook fingers 29 into the recess 25 formed in the flange.

The sand spikes 13 are also held in place by the belt, but are shown as inserted into slits 33 formed in the belts.

When the bail 16 is moved into its upright position it is held in place by the sleeve 30 on the bail and the flange 32. The handle 17 on the bail provides a comfortable hand-hold for carrying the bucket and the associated paraphernalia. When the fisherman reaches the fishing spot and removes the rods 12, the handle provides a convenient support for leaning the rod with its butt on the ground and the free end extending into the air. The rod is then in a perfect position for support while mounting hooks, plugs, and bait preparatory to the actual fishing.

FIGS. 5 and 6 show a variation of the means for clipping the elastic belts to the flange 31. The elastic belts 26a are formed from medical tubing and are provided at one end with the hooks 27 and the loop 28. At the other end, however, the belts are attached to a ring 28a and extend through an aperture in a clip 27a that is semi-permanently attached to the flange. In that way, the belts can hang from the clip (as shown in FIG. 5) when the fishing rods have been removed, so that the belts will not become lost.

As is also shown in FIG. 6, the bail 16 in the preferred embodiment is significantly longer relative to the bucket diameter than in a conventional bucket. This enhances the usefulness of the device as a rod holding means.

It should be noted that in carrying the bucket and gear from the vehicle to the beach, all the equipment is securely held in place and can be easily and safely maneuvered around trees and shrubs, and possibly people. Nothing is loose to cause problems, such as by falling off, catching on vegetation, or entangling the fisherman. At the fishing location, all the equipment is protected from falling into the sand and becoming lost; this is particularly true of the small gear contained in the apron pockets. The fact that the pockets are formed of a clear elastomer provides for ready visibility of the small items contained in the pockets. Furthermore, the presence of the apron does not inhibit access to the bait located at the bottom of the bucket.

The invention having been thus described, what is claimed as new and desired to secure by Letters Patent is:

1. A fishing apparatus, comprising:
   (a) a bucket having a bottom, an inner surface, and a tubular main body terminating in an upper edge, and
   (b) a flexible apron extending over said upper edge of the bucket and extending downwardly therefrom along the inner surface of the main body, said apron shaped to conform to said inner surface, and provided with upwardly opening pockets to receive tackle, wherein the apron extends substantially completely around the upper interior portion of the bucket leaving a central area of free access to said bottom of said bucket, and
   (c) a substantially continuous, flexible clip means on said apron adapted and shaped to correspond to said upper edge of the bucket and to envelop said edge to support the weight of the apron and of any tackle carried in the pockets.

2. a fishing apparatus as recited in claim 1 wherein the apron and pockets are formed of a smooth, transparent, flexible polymeric material which is resistant to corrosion by water and salt.

3. A fishing apparatus, comprising:
   (a) a bucket having a bottom, an inner surface, and a tubular main body terminating in an upper edge, and
   (b) a flexible apron extending over said upper edge of the bucket and extending downwardly therefrom along the inner surface of the main body, said apron shaped to conform to said inner surface, and provided with upwardly opening pockets to receive tackle, wherein the apron extends substantially completely around the upper interior portion of the bucket leaving a central area of free access to said bottom of said bucket, (c) a substantially continuous, flexible clip means on said apron adapted and shaped to correspond to said upper edge of the bucket and to envelop said edge to support the weight of the apron and of any tackle carried in the pockets, (d) an annular flange on the bucket extending completely around the bucket, spaced downwardly from the upper edge thereof, the flange having a downwardly directed recess, and (e) At least a pair of substantially parallel elastic belts for holding an elongated object, the belts extending generally diametrically across the upper edge of the bucket and having a hook means at each end that engages the flange and locks into the said downwardly directed recess.

4. A fishing apparatus, comprising:

(a) a bucket having a bottom, an inner surface, and a tubular main body terminating in an upper edge, (b) a flexible apron extending over said upper edge of the bucket and extending downwardldy therefrom along the inner surface of the main body, said apron shaped to conform to said inner surface and provided with upwardldy opening pockets to receive tackle, wherein the apron extends substantially completeldy around the upper interior portion of the bucket leaving a central area of free access to said bottom of said bucket, (c) a substantially continuous, flexible clip means on said apron adapted and shaped to correspond to said upper edge of the bucket and to envelop said edge to support the weight of the apron and of any tackle carried din the pockets, (d) a bail attached to the bucket, (e) a handle mounted on the bail which handle is generally cylindrical with enlarged ends to provide support fo an elongated object, (f) a flange extending around the bucket and spaced from the upper edge to which the bail is hingedly attached at its ends, and (g) an elongated friction bar extending from the bucket spaced upwardldy from and parallel to the flange for frictional engagement with the bail to lock it in a selected angular position.

5. A fishing apparatus, comprising:

(a) a bucket, (b) a bail attached to the bucket, (c) a handle mounted on the bail which handle is generally cylindrical with enlarged ends to provide support for an elongated object, (d) a flange extending around the bucket and spaced from the upper edge to which the bail is hingedly attached at its ends, (e) an elongated friction bar extending from the bucket spaced upwardly from and parallel to the flange for frictional engagement with the bail to lock it in a selected angular position, and (f) resilient sleeves on the bails adjacent the friction bar and configured to increase frictional resistance of the bail against the bar.

* * * * *